US012739618B2

(12) United States Patent
Hu et al.

(10) Patent No.: US 12,739,618 B2
(45) Date of Patent: Sep. 15, 2026

(54) TERMINAL RECOGNITION METHOD AND COMPUTER DEVICE

(71) Applicant: GUANGDONG OPPO MOBILE TELECOMMUNICATIONS CORP., LTD., Dongguan (CN)

(72) Inventors: Yi Hu, Dongguan (CN); Qianxi Lu, Dongguan (CN); Bingxue Leng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 329 days.

(21) Appl. No.: 18/405,755

(22) Filed: Jan. 5, 2024

(65) Prior Publication Data

US 2024/0147222 A1 May 2, 2024

Related U.S. Application Data

(63) Continuation of application No. PCT/CN2021/105853, filed on Jul. 12, 2021.

(51) Int. Cl.

*H04W 8/24* (2009.01)
*H04L 5/00* (2006.01)
*H04W 72/40* (2023.01)

(52) U.S. Cl.

CPC ............. *H04W 8/24* (2013.01); *H04L 5/0051* (2013.01); *H04W 72/40* (2023.01)

(58) Field of Classification Search

CPC ....... H04W 8/24; H04W 72/40; H04W 8/005; H04W 76/14; H04W 92/18; H04L 5/0051

See application file for complete search history.

(56) References Cited

U.S. PATENT DOCUMENTS

| | | | |
|---|---|---|---|
| 2020/0178343 A1 | 6/2020 | Kim et al. | |
| 2021/0100003 A1 | 4/2021 | Liu et al. | |
| 2024/0080872 A1* | 3/2024 | Chen | H04W 72/20 |
| 2024/0114569 A1* | 4/2024 | Wei | H04L 5/0091 |

FOREIGN PATENT DOCUMENTS

| | | |
|---|---|---|
| CN | 112351418 A | 2/2021 |
| WO | 2020087468 A1 | 5/2020 |
| WO | 2021046798 A1 | 3/2021 |
| WO | 2022170610 A1 | 8/2022 |

OTHER PUBLICATIONS

Email discussion summary for [RAN-R18-WS-non-eMBB-Overall] , dated Jun. 7, 2021(129 pages).

(Continued)

*Primary Examiner* — Shawn D Miller

(74) *Attorney, Agent, or Firm* — Ladas & Parry LLP

(57) ABSTRACT

A terminal recognition method and a computer device are provided. The method includes receiving a first message through a sidelink, wherein the first message is a message transmitted by a second terminal before the second terminal performs a capability information exchange process with the first terminal through the sidelink; and recognizing a terminal type of the second terminal based on the first message, wherein the terminal type comprises a Reduced Capability (RedCap) terminal.

18 Claims, 4 Drawing Sheets

First terminal

Second terminal

S501, before performing the capability information exchange process through the sidelink, transmitting the first message through the sidelink on a resource of a resource pool of the terminal type of the second terminal S502, receiving the first message through the sidelink S503, recognizing the terminal type of the second terminal based on a resource pool to which a resource corresponding to the first message belongs.

S504, communicating with the second terminal based on the terminal type of the second terminal

(56) References Cited

OTHER PUBLICATIONS

Radio Resource Control (RRC) protocol specification(Release 16) , dated Jun. 7, 2021(956 pages).
European Search Report, European Patent Application No. 21949586.8, mailed Jan. 8, 2024 (4 pages).
R1-2106329, LS on RAN1 agreements on RAN2-led features for RedCap ; In May 2021, LS presented the conclusions of the RAN1 group meeting on the RedCap terminal indication method.
Fujitsu Device type definition and how to signal the device type to network 3GPP TSG-RAN WG2 Meeting #112 electronic R2-2009008 ; Last two paragraphs on p. 2 of Nov. 2020 (Nov. 2020).
International Search Report and Written Opinion, International Application No. PCT/CN2021/105853, mailed Apr. 7, 2022 (13 pages).

* cited by examiner

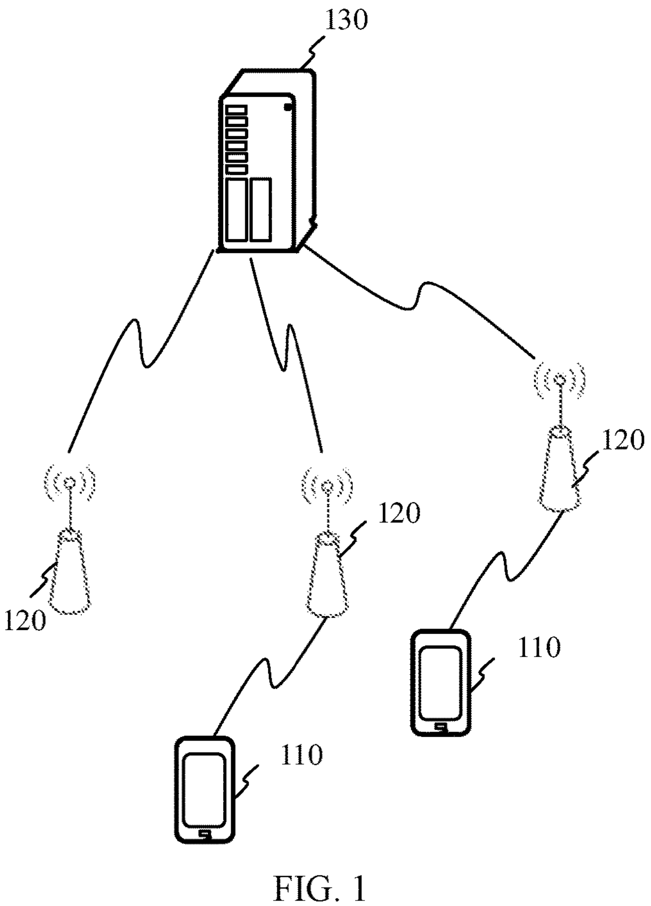

FIG. 1

| receiving a first message through a sidelink. The first message is a message transmitted by a second terminal before the second terminal performs a capability information exchange process with the first terminal through the sidelink. | 201 |
|---|---|

↓

| recognizing a terminal type of the second terminal based on the first message. The terminal type includes a Reduced Capability (RedCap) terminal. | 202 |
|---|---|

FIG. 2

| transmitting the first message through the sidelink before performing the capability information exchange process with the first terminal through the sidelink. The first message is configured to indicate the first terminal to recognize the terminal type of the second terminal, and the terminal type includes the RedCap terminal. | 301 |
|---|---|

FIG. 3

TERMINAL RECOGNITION METHOD AND COMPUTER DEVICE

CROSS REFERENCE TO RELATED APPLICATIONS

The present disclosure is a continuation of International Application No. PCT/CN2021/105853 filed Jul. 12, 2021, which is herein incorporated by reference in its entirety.

TECHNICAL FIELD

The present disclosure relates to a field of radio communication technologies, and in particular to a terminal recognition method and a computer device.

BACKGROUND

Sidelink technologies are near field communication technologies in which terminals directly communicate information to each other through radio interfaces among them.

In related art, Reduced Capability (RedCap) terminal equipment is introduced in order to reduce costs of devices. Accordingly, in sidelink communications, each of both communication sides is required to recognize whether an opposite side thereof is a RedCap terminal, so as to employ a corresponding communication strategy for communication.

SUMMARY OF THE DISCLOSURE

The present disclosure provides a terminal recognition method, a terminal recognition apparatus, a computer device, and a storage medium. The technical solution is as follows.

In a first aspect, a terminal recognition method is provided. The method is performed by a first terminal and includes receiving a first message through a sidelink, wherein the first message is a message transmitted by a second terminal before the second terminal performs a capability information exchange process with the first terminal through the sidelink; and recognizing a terminal type of the second terminal based on the first message, wherein the terminal type includes a Reduced Capability (RedCap) terminal.

In a second aspect, a terminal recognition method is provided. The method is performed by a second terminal and includes transmitting a first message through a sidelink before performing a capability information exchange process with a first terminal through the sidelink, wherein the first message is configured to indicate the first terminal to recognize a terminal type of the second terminal, and the terminal type includes a Reduced Capability (RedCap) terminal.

In a third aspect, a computer device is provided. The computer device is implemented as the first terminal. The computer device includes a processor, a memory, and a transceiver. The transceiver is configured to receive a first message through a sidelink, wherein the first message is a message transmitted by a second terminal before the second terminal performs a capability information exchange process with the first terminal through the sidelink. The processor is configured to recognize a terminal type of the second terminal based on the first message, wherein the terminal type includes a Reduced Capability (RedCap) terminal. Alternatively, the computer device is implemented as a first terminal and comprises: a processor; a memory; a transceiver, configured to transmit a first message through a sidelink before performing a capability information exchange process with a first terminal through the sidelink, wherein the first message is configured to indicate the first terminal to recognize a terminal type of the second terminal, and the terminal type comprises a Reduced Capability (RedCap) terminal.

BRIEF DESCRIPTION OF THE DRAWINGS

Accompanying drawings herein are incorporated into and form a part of the description, which illustrate embodiments consistent with the present disclosure and are configured in conjunction with the description to explain the principle of the present disclosure.

FIG. 1 is a schematic diagram of an implementation environment illustrated according to an exemplary embodiment of the present disclosure.

FIG. 2 is a flowchart of a terminal recognition method illustrated according to an exemplary embodiment of the present disclosure.

FIG. 3 is a flowchart of a terminal recognition method illustrated according to an exemplary embodiment of the present disclosure.

DETAILED DESCRIPTION

Figure 4:
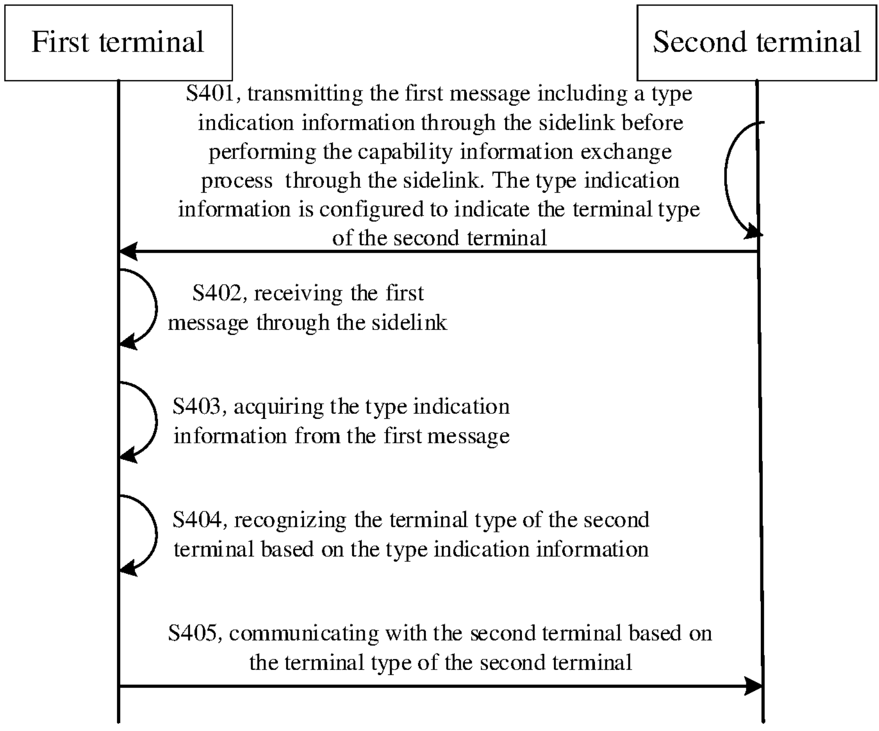
FIG. 4 is a flowchart of a terminal recognition method illustrated according to an exemplary embodiment of the present disclosure.

Exemplary embodiments will be described in detail herein, examples of which are illustrated in the accompanying drawings. For following description relating to the accompanying drawings, the same numeral in different drawings is configured to indicate the same or similar elements, unless otherwise indicated. The implementations described in the following exemplary embodiments do not represent all implementations consistent with the present disclosure. Rather, they are only examples of devices and methods which are consistent with some aspects of the present disclosure and detailed in appended claims.

It should be understood that the term "some" indicates one or more, and the term "multiple" indicates two or more. The term "and/or" describes an associated relationship of associated objects and may indicate that three relationships exist herein. For example, A and/or B, may indicate three cases: A exist alone, both A and B exist, and B exists alone. A character "/" generally indicates that associated objects before and after the character "/" have an "or" relationship.

FIG. 1 is a schematic diagram of an implementation environment involved in a terminal recognition method illustrated according to an exemplary embodiment of the present disclosure. As shown in FIG. 1, the implementation environment may include some user equipment 110 and base stations 120.

The user equipment 110 may be wireless communication devices which support multiple radio access technologies to perform sidelink transmission. For example, the user equipment 110 may support cellular mobile communication technologies. For example, the user equipment 110 may support the 5th Generation mobile communication (5G) technology. Alternatively, the user equipment 110 may support a more next generation mobile communication technology of the 5G technology.

For example, the user equipment may be an in-vehicle communication device, such as a trip computer having a wireless communication capability or a wireless communication device externally connected to the trip computer.

Alternatively, the user equipment 110 may be a roadside device. For example, the user equipment 110 may be a streetlight, signal light, or other roadside devices having the wireless communication capabilities.

Alternatively, the user equipment 110 may also be a user terminal device, such as a mobile phone (or referred to as a "cellular" phone) and a computer having a mobile terminal, e.g., a portable, pocket-sized, hand-held, computer-embedded, or vehicle-mounted mobile apparatus. For example, the user equipment 110 may be a station (STA), a subscriber unit, a subscriber station, a mobile station, a remote station, an access point, a remote terminal, an access terminal, a user terminal, a user agent, a user device, or a User Equipment (UE). For example, the user equipment 110 may be a mobile terminal such as a smartphone, a tablet, an e-book reader, etc., or may be a smart wearable device such as smart glasses, a smart watch, or a smart bracelet, etc.

The base station 120 may be a network-side device in a wireless communication system. The wireless communication system may also be a 5G system, also referred to as a New Radio (NR) system. Alternatively, the wireless communication system may be a further next-generation system of the 5G system.

The base station 120 may be a base station (gNB) which employs a central distributed architecture in the 5G system. When employing the central distributed architecture, the base station 120 typically includes a Central Unit (CU) and at least two Distributed Units (DUs). The CU is provided with a protocol stack of a Packet Data Convergence Protocol (PDCP) layer, a Radio Link Control (RLC) protocol layer, and a Media Access Control (MAC) layer. The DUs are provided with a physical (PHY) layer protocol stack. Specific implementation manners of the base station 120 are not limited in the embodiments of the present disclosure.

A wireless connection may be established between the base station 120 and the user equipment (UE) 110 through a wireless air interface. The wireless air interface is a wireless air interface based on a 5G mobile communication network technology standard. For example, the wireless air interface is a new air interface. Alternatively, the wireless air interface may be a wireless air interface based on a more next generation mobile communication network technology standard of 5G.

In an embodiment, the wireless communication system described above may further include a network management device 130.

A number of base stations 120 are connected to the network management device 130, respectively. The network management device 130 may be a core network device in the wireless communication system. For example, the network management device 130 may be a Mobility Management Entity (MME) in an Evolved data Packet Core network (EPC). Alternatively, the network management device may be other core network devices, such as a Serving Gateway (SGW), a Public Data Network Gateway (PGW), a Policy and Charging Rules Function Unit (PCRF), or a Home Subscriber user Server (HSS), etc. Implementation forms of the network management device 130 are not limited in the embodiments of the present disclosure.

In addition to application scenarios such as an Enhanced Mobile Broadband (eMBB), an Ultra Reliable Low Latency Communication (URLLC), etc. supported by a R15/R16 NR, IoT (Internet of Things) application cases such as industrial wireless sensors, video surveillance, and wearables, etc., raises new requirements for 5G terminals, such as a reduced complexity and cost, a size calibration, and a lower energy consumption, etc. Consequently, a Reduced Capability UE (RedCap UE) is introduced in a R17 NR. In the related art, the RedCap UE includes devices in three scenarios.

The Industrial Wireless Sensors: compared to the URLLC, the industrial wireless sensors have lower-required latency and reliability. In addition, the industrial Wireless Sensors also have lower costs and power consumption than the URLLC and the eMBB. Key requirements and characteristics of such terminals include communication reliability being 99.99%, an end-to-end latency <100 ms, a reference data rate <2 Mbps, predominantly uplink services, device being stationary, and serving life of a battery up to several years. For sensors used in security related applications, the latency is required to be less, which is 5~10 ms.

The Video Surveillance: the video surveillance tends to be applied to video surveillance of smart cities, industrial factories, etc. For example, the video surveillance is used in data collection and processing in the smart cities to facilitate more effective monitoring and control of urban resources, which provides more effective services to urban residents. The video surveillance majors in uplink services, and other requirements of the video surveillance include a reference rate of an ordinary resolution video being 2~4 Mbps, a latency being less than 500 ms, and the communication reliability being 99%~99.9%; and a rate requirement for a High Definition (HD) video being 7.5~25 Mbps.

Wearables: the wearables include smart watches, smart bracelets, electronic health devices, some medical monitoring devices, and the like. A commonality of these devices is having small sizes. Key index requirements of such terminal devices include a downlink reference rate and an uplink reference rate being 5~50 Mbps and 2~5 Mbps, respectively, and a downlink peek rate and an uplink peek rate being 150 Mbps and 50 Mbps, respectively, and batteries being required to be able to serve for several days or even 1~2 weeks.

Faced with eMBB applications, in order to provide a higher peak rate, a higher frequency efficiency, and a higher network capacity, the 3GPP standard proposes a higher requirement for an eMBB UE. For example, for a NR FR1 frequency band, the eMBB UE is required to support function and performance indexes, such as a 100 MHz carrier bandwidth, 4 receive links (i.e., 4 Rx), 4 streams of Multiple-In Multiple-Out (MIMO) transmission, 256 Quadrature Amplitude Modulation (QAM), and a peak rate above 1 Gbps, etc. A higher requirement for both a radio frequency device and a processing capability of a baseband chip of the terminal is proposed, which decides or results in a higher complexity and cost of the eMBB UE.

For the RedCap UE, the following aspects are studied in the related art to reduce a capability requirement for the UE to reduce the complexity and the cost. That is, the RedCap UE refers to a terminal has a requirement for a capability parameter less than a conventional capability requirement. The capability parameter described above may include at least one of a maximum bandwidth, the number of Receive (Rx) antennas, the number of Transport (Tx) antennas, the number of MIMO layers, a maximum modulation order, a Frequency Division Duplexing (FDD) capability, a terminal processing duration, a supported maximum number of data radio bearers (DRBs), and a size of a layer-2 buffer area, and a PDCP/RLC Serial Number (SN) length. The conventional capability requirement above may refer to capability requirements for an eMBB terminal and an URLLC terminal.

1) Reducing the Maximum Bandwidth of the UE.

In order to enable the RedCap UE and the eMBB UE to share the same Synchronisation Signal (SS)/Physical Broadcast Channel (PBCH) block, a Control-Resource Set (CORESET) 0 and a System Information Block (SIB) 1 fails to coexist. The 3GPP has agreed through discussion to reduce a maximum bandwidth of the RedCap UE in a Frequency Range (FR) 1 frequency band from 100 MHz to 20 MHz. Meanwhile, a maximum bandwidth of the RedCap UE in a FR2 frequency band is reduced to 100 MHz.

2) Reducing the Number of UE Rx and/or Tx Antennas.

For the RedCap UE, following configurations for the number of antennas are considered.

For FR1: supporting 1Rx and/or 1Tx and 2Rx and/or 1Tx; and

For FR2: supporting 1Rx and/or 1Tx and 2Rx and/or 1Tx.

3) Reducing the Number of UE MIMO Layers.

The following options of a maximum number of (Downlink) DL MIMO layers are studied and estimated.

For FR1 FDD: supporting that the maximum number of the DL MIMO layers is 1;

For FR1 TDD (Time Division Duplex): supporting that the maximum number of the DL MIMO layers is 1 and 2; and For the FR2: supporting that the maximum number of the DL MIMO layers is 1.

4) Reducing the Maximum Modulation Order.

A use of a lower modulation order may reduce the requirement for the radio frequency device and the processing capability of the baseband chip. In an SI stage, the following options are studied for relaxation of the maximum modulation order.

For an Uplink (UL):

FR1: the maximum modulation order is reduced from 64QAM to 16QAM; and

FR2: the maximum modulation order is reduced from 64QAM to 16QAM.

For the Downlink (DL):

FR1: the maximum modulation order is reduced from 256QAM to 64QAM; and

FR2: the maximum modulation order is reduced from 64QAM to 16QAM.

5) A Half-Duplex FDD

Compared to a full-duplex FDD, the RedCap UE may perform transmission processes and reception processes at different moments at different frequencies through employing a half-duplex FDD mode. In implementation, a cheaper Rx-Tx antenna switch and a cheaper low-pass filters are configured to replace a more expensive duplexer.

In the 5G system, two half-duplex FDD (HD-FDD) modes are defined for the UE and includes a Type A and a Type B. Considering that a HD-FDD Type B is too complex, in the related art, it is determined through discussing that a FDD RedCap UE supports a HD-FDD Type A process in Rel-17.

6) Relaxing a Terminal Processing Duration.

Both an interval between a moment in which the UE receives a Physical Downlink Control Channel (PDCCH) and a moment in which the UE transmits a UL Hybrid Automatic Repeat Request (HARD) feedback and an interval between a moment in which the UE receives Physical Downlink Shared Channel (PDSCH) indicating an UL scheduling and a moment in which the UE transmits a Physical Uplink Shared Channel (PUSCH) require specific processing durations, respectively. The higher a processing capability of a hardware of the UE is, the shorter the processing durations are. A requirement for the processing durations of the UE is relaxed, that is, a longer processing duration is allowed, which may relax a requirement for a processing module of a receiver and reduce the cost.

7) Reducing the Maximum Number of the DRBs Mandatorily Supported by the Terminal.

In the Rel-15/Rel-16, the maximum number of the DRBs supported by the UE is 8, and this capability is a compulsory or required capability of the UE. In terms of three application scenarios supported by the RedCap, UE generally does not have multiple parallel services at the same time. In addition, the number of the DRBs may directly influence on sizes of a buffer area and a memory. Therefore, the maximum number of the DRBs supported by the UE may be considered to be reduced to reduce a cost of the terminal.

8) Reducing a Size of the Layer-2 Buffer Area.

The size of the layer-2 buffer area (including a PDCP buffer area and a RLC buffer area) depends on the number of an UL peak, and the number of an DL peak, and RLC RTT. Compared to the Rel-15/Rel-16 NR UE, a peak rate which the RedCap UE is required to support is reduced, and the layer-2 buffer area of the RedCap UE is also correspondingly reduced.

9) Reducing the PDCP/RLC SN Length.

The RLC/PDCP SN length is associated with a window length of a sliding window which a RLC/PDCP layer is required to support. In the Rel-15/Rel-16, a PDCP mode and a RLC AM mode are required to support an 18 bit SN length. When the size of the buffer area of the RedCap UE is reduced compared to the Rel-15/Rel-16, the RedCap UE is not required or forced to support the 18 bit of RLC/PDCP SN length.

The RedCap UE is supposed to be used in a scenario really requiring the RedCap UE and avoided to be misused in other scenarios and cause losses of a network capacity and a spectral efficiency. Therefore, when the RedCap UE attempts to initiate an unintended service, a radio access network or the core network may reject the RedCap UE to obtain the unintended service based on information, such as a s type of a service requested by the UE, a type of the RedCap UE, a contract of the RedCap UE, etc.

The capability of the RedCap UE is different from a conventional NR UE. The network is required to identify the RedCap UE as early as possible before receiving a capacity report of the UE in order to perform targeted processing. For example, due to a limitation of the maximum bandwidth of the RedCap UE, a transmission bandwidth scheduled for the RedCap UE is not allowed to be greater than a maximum bandwidth capability. A coverage compensation for the RedCap UE.

In a sidelink scenario such as V2X, after a PC5 interface based Radio Resource Control (PC5-RRC) connection is established between two UEs, one of the two UEs may make an opposite UE be aware of the capability thereof through a UE capability transmission process. However, before the UE capability transmission process, the opposite UE is not aware of an identity of the one of the two UEs. For the RedCap UE, since the RedCap UE has problems, such as a limitation of the transmission bandwidth, a coverage limitation, etc., when the opposite UE thereof uses an inappropriate transmission resource, e.g., the opposite UE uses a large-bandwidth resource to transmit data, the RedCap UE may be caused to fail to correctly receive the data, which may influence a normal communication between the UEs.

With respect to the above problem, subsequent embodiments of the present disclosure provide a scheme in which, in a sidelink communication scenario, whether the opposite terminal is the RedCap UE is recognized firstly, in addition to capability information exchanges being performed between the UEs.

FIG. 2 is a flowchart of a terminal recognition method illustrated according to an exemplary embodiment of the present disclosure. The terminal recognition method may be performed by a first terminal. For example, the first terminal may be a UE 110 in an implementation environment illustrated in FIG. 1. As shown in FIG. 2, the method may include operations 201 and 202.

At block 201, the method may include receiving a first message through a sidelink. The first message is a message transmitted by a second terminal before the second terminal performs a capability information exchange process with the first terminal through the sidelink.

At block 202, the method may include recognizing a terminal type of the second terminal based on the first message. The terminal type includes a Reduced Capability (RedCap) terminal.

That is, the terminal type described above may indicate whether the second terminal transmitting the first message is the RedCap terminal or a non-RedCap terminal.

In the embodiment of the present disclosure, the first message may indicate whether the second terminal is the RedCap terminal in an explicit manner or in an implicit manner.

In summary, according to the scheme shown in the embodiments of the present disclosure, in the sidelink communication, before terminal capability information is transmitted between the first terminal and the second terminal, the second terminal may indicate whether it is the RedCap terminal through the first message, such that the first terminal may subsequently communicate with the second terminal based on information of whether the second terminal is the RedCap terminal. In this way, a success rate of a sidelink communication of the RedCap terminal may be improved, and a communication efficiency of the sidelink may be improved.

FIG. 3 is a flowchart of a terminal recognition method illustrated according to an exemplary embodiment of the present disclosure. The terminal recognition method may be performed by the second terminal. For example, the second terminal may be the UE 110 in the implementation environment illustrated in FIG. 1. As shown in FIG. 3, the method may include an operation 301.

At block 301, the method may include transmitting the first message through the sidelink before performing the capability information exchange process with the first terminal through the sidelink. The first message is configured to indicate the first terminal to recognize the terminal type of the second terminal, and the terminal type includes the RedCap terminal.

In summary, according to the scheme shown in the embodiments of the present disclosure, in the sidewalk link communication, before the terminal capability information is transmitted between the first terminal and the second terminal, the second terminal may indicate whether it is the RedCap terminal through the first message, such that the first terminal may subsequently communicate with the second terminal based on information of whether the second terminal is the RedCap terminal. In this way, the success rate of the sidelink communication of the RedCap terminal may be improved, and the communication efficiency of the sidelink may be improved.

In an embodiment of the above scheme illustrated in FIG. 2 or FIG. 3, the second terminal may add indication information to the first message transmitted to the first terminal to indicate the terminal type of the second terminal before exchanging the terminal capability information with the first terminal.

FIG. 4 is a flowchart of a terminal recognition method illustrated according to an exemplary embodiment of the present disclosure. The terminal recognition method may be performed interactively by the first terminal and the second terminal. For example, the first terminal and the second terminal may be UEs 110 in the implementation environment illustrated in FIG. 1. As shown in FIG. 4, the method may include operations S401-S405.

At block S401, the method may include the second terminal transmitting the first message including a type indication information through the sidelink before performing the capability information exchange process with the first terminal through the sidelink. The type indication information is configured to indicate the terminal type of the second terminal.

The first message is configured to indicate the first terminal to recognize the terminal type of the second terminal. For example, the first message is configured to indicate the terminal type in the explicit manner through the type indication information carried in the first message. The terminal type includes the RedCap terminal.

In the embodiment of the present disclosure, the second terminal may carry the type indication information in the explicit manner through a message or signaling before a terminal capability information exchange process.

In some embodiments, the type indication information may be a specified field in the first message. For example, when the specified field has a value of 0, it indicates that the second terminal is the RedCap terminal. When the specified field has a value of 1, it indicates that the second terminal is the non-RedCap terminal.

In an embodiment, the first message includes at least one of a PC5 interface (PC5) based Security (PC5-S) message, a PCS based Radio Resource Control (PC5-RRC) message, a Media Access Control layer Control Element (MAC CE), a Physical Sidelink Control Channel (PSCCH) message.

In the embodiment of the present disclosure, the second terminal may carry the type indication information mentioned above through an existing message/signalling.

For example, the second terminal may carry the type indication information through the PC5-S message, the PC5-RRC message, the MAC CE, or the PSCCH message.

Alternatively, the second terminal may carry the type indication information mentioned above through multiple messages/signalling of the PC5-S message, the PC5-RRC message, the MAC CE, or the PSCCH message.

In the embodiment of the present disclosure, when the second terminal carries the type indication information mentioned above through the existing message/signalling, the second terminal may carry the type indication information through a reserved field in the existing message/signalling.

In an embodiment, the PC5-S message includes at least one of a message of Discovery announce on PC5, a message of announce a Proximity Service (ProSe) Query Code on PC5, a message of a ProSe Response Code on PC5, a Direct Communication Request message, and a Direct Communication Accept message.

For example, in a ProSe Direct Discovery process, a mode A and a mode B are described.

For the Mode A:

If an announcing UE (corresponding to the second terminal described above) is the RedCap UE, the announcing UE carries a RedCap UE indication information in the message of Discovery announce on PC5 to notify a monitoring UE (corresponding to the first terminal described above) that the announcing UE is the RedCap UE.

For the Mode B:

If the discoverer UE (corresponding to the second terminal described above) is the RedCap UE, the discoverer UE carries the RedCap UE indication information in the message of announce a ProSe Query Code on PC5 to notify a discoveree UE (corresponding to the first terminal described above) that the discoverer UE is the RedCap UE.

If the discoveree UE (the second terminal) is the RedCap UE, the discoveree UE carries the RedCap UE indication information in the message of the ProSe Response Code on PC5 if a ProSe Query Code matches, to notify the discoverer UE (the first terminal) that the discoveree UE is the RedCap UE.

For another example, in an establishment process of an L2 link on which a V2X communication process is performed through an PC5 reference point, if a UE1 (the second terminal) is the RedCap UE, the UE1 carries the RedCap UE indication information (i.e., the type indication information described above) in the Direct Communication Request message to notify a UE2 (the first terminal) that the UE1 is the RedCap UE; if the UE2 (the second terminal) is the RedCap UE, the UE2 carries the RedCap UE indication information in the Direct Communication Accept message to notify the UE1 (the first terminal) that the UE2 is the RedCap UE.

In another embodiment, the first message described above may also be a message which is newly added and transmitted before the terminal capability information exchange process.

At block 402, the method includes the first terminal receiving the first message through the sidelink.

Before exchanging a terminal capability with the second terminal, the first terminal may receive the first message transmitted by the second terminal.

At block 403, the method may include the first terminal acquiring the type indication information from the first message.

In the embodiment of the present disclosure, after receiving the first message, the first terminal may extract the type indication information explicitly carried in the first message. For example, the first terminal extracts a value configured to indicate the terminal type of the second terminal from the specified field of the first message.

At block 404, the method may include the first terminal recognizing the terminal type of the second terminal based on the type indication information.

After the first terminal acquires the type indication information, the first terminal may recognize the terminal type of the second terminal based on a relationship between the type indication information and the terminal type.

In an embodiment, in the first terminal and the second terminal, a corresponding relationship between the type indication information and the terminal type may be configured by a network side in a statical/semi-statical manner. Alternatively, the corresponding relationship between the type indication information and the terminal type may be predefined through a protocol.

In an embodiment, the terminal type is configured to indicate at least one information of a terminal transmitting the first message being the RedCap terminal or the non-RedCap terminal; a RedCap-terminal sub type of the terminal transmitting the first message, in response to the terminal transmitting the first message being the RedCap terminal; the RedCap-terminal sub type including at least one of a high-level RedCap terminal, a low-level RedCap terminal, a RedCap terminal of a FR1 frequency band, and a RedCap terminal of the FR2 frequency band; the high-level RedCap terminal and the low-level RedCap terminal being RedCap terminals which are divided based on specified capability information, and the specified capability information including at least one of a transmission rate, the number of the Rx antennas, the number of the Tx antennas, and a maximum supported bandwidth; an application scenario of the terminal transmitting the first message in response to the terminal transmitting the first message being the RedCap terminal; the number of the Rx antennas of the terminal transmitting the first message in response to the terminal transmitting the first message being the RedCap terminal; the number of the Tx antennas of the terminal transmitting the first message in response to the terminal transmitting the first message being the RedCap terminal; and a maximum bandwidth supported by the terminal transmitting the first message in response to the terminal transmitting the first message being the RedCap terminal.

In an embodiment, a distinguishing manner of the terminal type mentioned above may include but is not limited to one or more manner of a distinguishment of the RedCap UE and the non-RedCap UE, a distinguishment of a RedCap terminal type, a distinguishment of application scenarios of the RedCap terminal, a distinguishment of the number of the Rx/Tx antennas, and a distinguishment of the maximum bandwidth of the UE.

The distinguishment of a RedCap terminal type, e.g., a distinguishment of the high-level RedCap UE and the low-level RedCap UE, and/or a distinguishment of the RedCap terminal of the FR1 frequency band and the RedCap terminal of the FR2 frequency band. The high-level RedCap UE and the low-level RedCap UE are distinguished based on a capability level. For example, a RedCap UE having an uplink/downlink rate greater than a rate threshold is the high-level RedCap UE, and otherwise the low-level RedCap UE. Alternatively, a RedCap UE having the number of the Rx antennas or the Tx antennas greater than a number threshold is the high-level RedCap UE, and otherwise the low-level RedCap UE. For another example, a RedCap UE having the supported maximum bandwidth greater than a bandwidth threshold is the high-level RedCap UE, and otherwise the low-level RedCap UE, etc.

The distinguishment of application scenarios of the RedCap terminal. For example, the application scenarios of the RedCap terminal may include at least two of a wireless industrial scenario, a video surveillance scenario, and a wearable scenario. That is, the terminal type described above may distinguish whether the RedCap terminal belongs to an industrial wireless sensor, a video surveillance device, a wearable device, or the like.

The distinguishment of the number of the Rx/Tx antennas. For example, the number of the Rx antennas and the number of the Tx antennas of the UE are distinguished to be 2 and 4, respectively.

The distinguishment of the maximum bandwidth of the UE. For example, it is distinguished which of 100 MHz, 20 MHz, and 10 MHz is the maximum bandwidth of the UE of the FR1 frequency band.

At block 405, the method may include the first terminal communicating with the second terminal based on the terminal type of the second terminal.

After the first terminal recognizes the terminal type of the second terminal, the first terminal may employ a corresponding communication strategy based on the terminal type of the second terminal to communicate with the second terminal through the sidelink.

For example, when the first terminal recognizes that the second terminal is the RedCap terminal type, the first terminal may select a strategy (e.g., selecting a resource and a bandwidth used for communication) to communicate with the second terminal based on the second terminal being recognized to be at least one of information such as the RedCap terminal, the RedCap terminal type, a RedCap terminal scenario, the number of the Rx antennas and/or the number of the Tx antennas, and the maximum bandwidth.

In summary, according to the scheme shown in the embodiment of the present disclosure, in the sidewalk link communication, before the terminal capability information is transmitted between the first terminal and the second terminal, the second terminal may indicate whether it is the RedCap terminal through explicitly-carried indication information in the first message, such that the first terminal may subsequently communicate with the second terminal based on the information of whether the second terminal is the RedCap terminal. In this way, the success rate of the sidelink communication of the RedCap terminal may be improved, and the communication efficiency of the sidelink may be improved.

In an embodiment of the scheme shown in FIG. 2 or FIG. 3 above, before exchanging the terminal capability with the first terminal, the second terminal may implicitly indicate the terminal type thereof to the first terminal through a resource pool used for transmitting a message.

Figure 5:
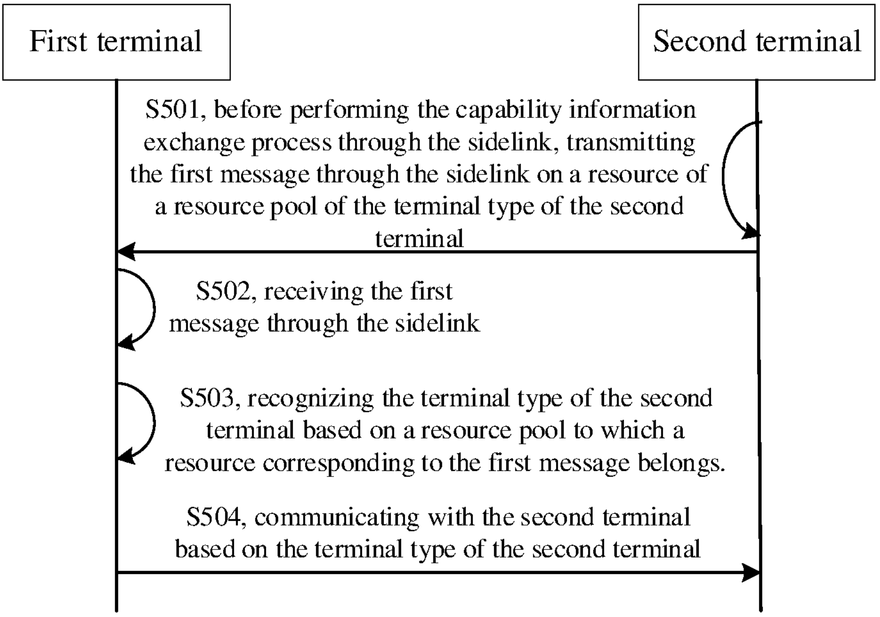
FIG. 5 is a flowchart of a terminal recognition method illustrated according to an exemplary embodiment of the present disclosure.

FIG. 5 is a flowchart of a terminal recognition method illustrated according to an exemplary embodiment of the present disclosure. The terminal recognition method may be performed interactively by the first terminal and the second terminal. For example, the first terminal and the second terminal may be the UEs 110 in the implementation environment illustrated in FIG. 1. As shown in FIG. 5, the method may include operations S501-S504.

At block 501, the method may include the second terminal transmitting the first message through the sidelink before performing the capability information exchange process with the first terminal through the sidelink on a resource of a resource pool of the terminal type of the second terminal.

The first message is configured to indicate the first terminal to recognize the terminal type of the second terminal. The terminal type includes the RedCap terminal.

That is, in the embodiment of the present disclosure, the second terminal may also implicitly indicate whether it is the RedCap terminal through a transmission resource of the first message.

In the embodiment of the present disclosure, resource pools of different terminal types satisfy at least one condition of resources in the resource pools of the different terminal types having no overlap in a time domain; the resources in the resource pools of the different terminal types having no overlap in a frequency domain; the resource pools of the different terminal types corresponding to different Demodulation Reference Signal (DMRS) scrambling code Identities (IDs); and the resource pools of the different terminal types corresponding to different Physical Sidelink Feedback Channel (PSFCH) cyclic displacements.

In the embodiment of the present disclosure, the network side may configure different transmitting resource pools and/or receiving resource pools for different terminal types. The transmitting resource pools and/or receiving resource pools corresponding to the different terminal types may be configured by the network side (e.g., a base station) into the terminals. For example, the transmitting resource pools and/or receiving resource pools corresponding to the different terminal types are configured by a network side device into the terminal through a system message. In an embodiment, a distinguishing manner of different resource pools configured for the different terminal types may include a method 1, a method 2, and a method 3.

The method 1: the resource pools of the different terminal types correspond to different time-frequency domain resources and have no overlap in a time domain.

The method 2: PSCCH configurations of the resource pools of the different terminal types correspond to different DMRS scrambling code IDs.

The method 3: the resource pools of the different terminal types are distinguished through cyclic shifts used for PSFCH transmissions.

At block 502, the method may include the first terminal receiving the first message through the sidelink.

At block 503, the method may include the first terminal recognizing the terminal type of the second terminal based on a resource pool to which a resource corresponding to the first message belongs. The terminal type includes a RedCap terminal.

The second terminal determines a transmitting resource pool and/or a receiving resource pool to which the second terminal corresponds based on the terminal type to which the second terminal belongs.

For example, the UE1 (the second terminal) makes the UE2 (the first terminal) aware of the terminal type of the UE1 through transmitting the first message by using a resource in the transmitting resource pool corresponding to the terminal type to which the second terminal belongs. For example, if the UE1 is the RedCap UE, the UE1 transmits through the resource in the transmitting resource pool corresponding to the RedCap terminal. In this way, the UE2 may be informed that the UE1 is the RedCap UE through the transmission resource corresponding to the first message in combination with a preconfigured corresponding relationship between the terminal type and the transmitting resource pool and/or the receiving resource pool.

At block 504, the method may include the first terminal communicating with the second terminal based on the terminal type of the second terminal.

In an embodiment, the terminal type is configured to indicate at least one information of the terminal transmitting the first message being the RedCap terminal or the non-RedCap terminal; the RedCap-terminal sub type of the terminal transmitting the first message, in response to the terminal transmitting the first message being the RedCap terminal; the RedCap-terminal sub type includes at least one of the high-level RedCap terminal, the low-level RedCap terminal, the RedCap terminal of the FR1 frequency band, and the RedCap terminal of the FR2 frequency band; the high-level RedCap terminal and the low-level RedCap terminal are RedCap terminals which are divided based on specified capability information, and the specified capability information includes at least one of the transmission rate, the number of the Rx antennas, the number of the Tx antennas, and the maximum supported bandwidth; the application scenario of the terminal transmitting the first message in response to the terminal transmitting the first message being the RedCap terminal; the number of the Rx antennas of the terminal transmitting the first message in response to the terminal transmitting the first message being the RedCap terminal; the number of the Tx antennas of the terminal transmitting the first message in response to the terminal transmitting the first message being the RedCap terminal; and the maximum bandwidth supported by the terminal transmitting the first message in response to the terminal transmitting the first message being the RedCap terminal.

In summary, according to the scheme shown in the embodiment of the present disclosure, in the sidewalk link communication, before the terminal capability information is transmitted between the first terminal and the second terminal, the second terminal may implicitly indicate whether it is the RedCap terminal through the resource pool to which the first message belongs, such that the first terminal may subsequently communicate with the second terminal based on the information of whether the second terminal is the RedCap terminal. In this way, the success rate of the sidelink communication of the RedCap terminal may be improved, and the communication efficiency of the sidelink may be improved.

In an embodiment of the scheme shown in FIG. 2 or FIG. 3 above, before exchanging the terminal capability with the first terminal, the second terminal may implicitly indicate the terminal type thereof to the first terminal through transmitting a lay-2 ID of the message.

Figure 6:
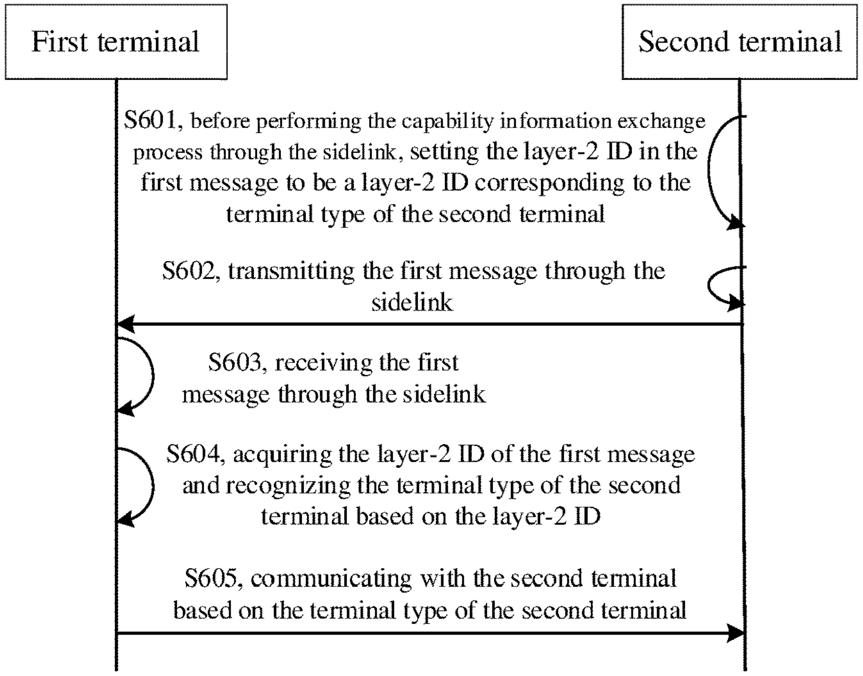
FIG. 6 is a flowchart of a terminal recognition method illustrated according to an exemplary embodiment of the present disclosure.

FIG. 6 is a flowchart of a terminal recognition method illustrated according to an exemplary embodiment of the present disclosure. The terminal recognition method may be performed by the second terminal. For example, the first terminal and the second terminal may be the UEs 110 in the implementation environment illustrated in FIG. 1. As shown in FIG. 6, the method may include operations 601-605.

At block 601, the method may include before performing the capability information exchange process with the first terminal through the sidelink, the second terminal setting the layer-2 ID in the first message to be a layer-2 ID corresponding to the terminal type of the second terminal.

In the embodiment of the present disclosure, the second terminal may also implicitly indicate whether it is the RedCap terminal through the layer-2 ID of the first message.

At block 602, the method may include the second terminal transmitting the first message through the sidelink.

The first message is configured to indicate the first terminal to recognize the terminal type of the second terminal. The terminal type includes the RedCap terminal.

In the embodiment of the present disclosure, different layer-2 IDs may be reserved for the different terminal types in a network-configuring manner or a protocol-predefining manner. In addition, layer-2 ID sets reserved for the different terminal types have no intersection or overlap with each other.

At block 603, the method may include the first terminal receiving the first message through the sidelink.

At block 604, the method may include the first terminal acquiring the layer-2 ID of the first message and recognizing the terminal type of the second terminal based on the layer-2 ID of the first message.

For example, in the establishment process of the L2 link on which a (Vehicle-to-Everything) V2X communication process is performed through the PC5 reference point, the UE1 (the second terminal) determines the layer-2 ID thereof based on the terminal type to which the UE1 belongs and transmits the first message based on a determined layer-2 ID. In this way, after the UE2 (the first terminal) receives the first message, the UE2 may be informed of the terminal type of the opposite UE1 through the layer-2 ID of the opposite UE1 and the preconfigured corresponding relationship between the layer-2 ID and the terminal type. In an embodiment, the terminal type is configured to indicate at least one information of the terminal transmitting the first message being the RedCap terminal or the non-RedCap terminal; the RedCap-terminal sub type of the terminal transmitting the first message, in response to the terminal transmitting the first message being the RedCap terminal; the RedCap-terminal sub type includes at least one of the high-level RedCap terminal, the low-level RedCap terminal, the RedCap terminal of the FR1 frequency band, and the RedCap terminal of the FR2 frequency band; the high-level RedCap terminal and the low-level RedCap terminal are RedCap terminals which are divided based on specified capability information, and the specified capability information includes at least one of the transmission rate, the number of the Rx antennas, the number of the Tx antennas, and the maximum supported bandwidth; the application scenario of the terminal transmitting the first message in response to the terminal transmitting the first message being the RedCap terminal; the number of the Rx antennas of the terminal transmitting the first message in response to the terminal transmitting the first message being the RedCap terminal; the number of the Tx antennas of the terminal transmitting the first message in response to the terminal transmitting the first message being the RedCap terminal; and the maximum bandwidth supported by the terminal transmitting the first message in response to the terminal transmitting the first message being the RedCap terminal.

At block 605, the method may include the first terminal communicating with the second terminal based on the terminal type of the second terminal.

In summary, according to the scheme shown in the embodiment of the present disclosure, in the sidewalk link communication, before the terminal capability information is transmitted between the first terminal and the second terminal, the second terminal may implicitly indicate whether it is the RedCap terminal through the layer-2 ID of the first message, such that the first terminal may subsequently communicate with the second terminal based on the information of whether the second terminal is the RedCap terminal. In this way, the success rate of the sidelink communication of the RedCap terminal may be improved, and the communication efficiency of the sidelink may be improved.

In an embodiment of the scheme shown in FIG. 2 or FIG. 3 above, before exchanging the terminal capability with the first terminal, the second terminal may implicitly indicate the terminal type thereof to the first terminal through a physical layer parameter of a transmitted message.

Figure 7:
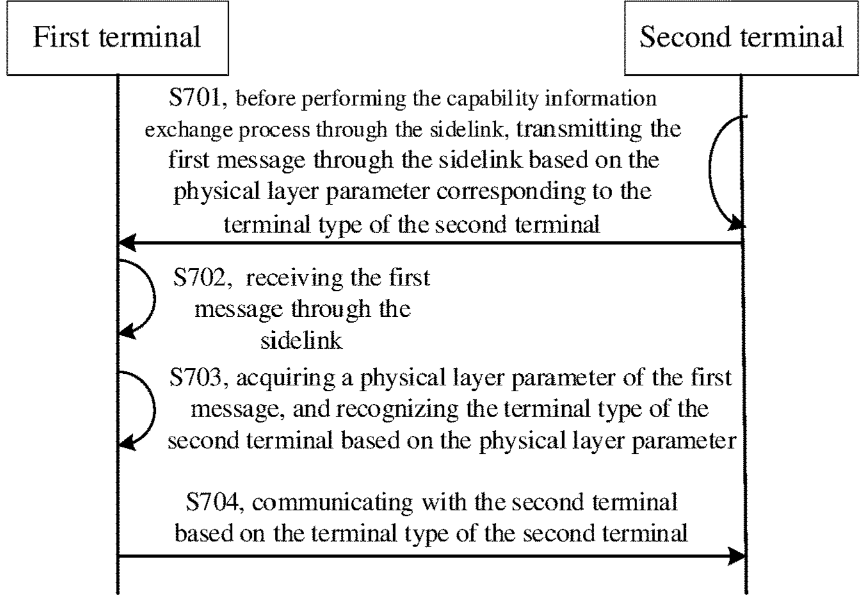
FIG. 7 is a flowchart of a terminal recognition method illustrated according to an exemplary embodiment of the present disclosure.

FIG. 7 is a flowchart of a terminal recognition method illustrated according to an exemplary embodiment of the present disclosure. The terminal recognition method may be performed interactively by the first terminal and the second terminal. For example, the first terminal and the second terminal may be the UEs 110 in the implementation environment illustrated in FIG. 1. As shown in FIG. 7, the method may include operations 701-704.

At block S701, the method may include before performing the capability information exchange process with the first terminal through the sidelink, the second terminal transmitting the first message through the sidelink based on the physical layer parameter corresponding to the terminal type of the second terminal.

In the embodiment of the present disclosure, the second terminal may also implicitly indicate whether it is the RedCap terminal by a physical layer parameter of the first message.

In an embodiment, the physical layer parameter includes at least one of a reference signal sequence and a reference signal cyclic shift.

In the embodiment of the present disclosure, different physical layer parameters may be reserved for the different terminal types in the network-configuring manner or the protocol-predefining manner. The physical layer parameters include, but not limited to the Reference Signal (RS) sequence and the RS cyclic shift.

In the sidelink communication, the UE (the second terminal) may employ the physical layer parameter corresponding to the terminal type thereof according to the terminal type thereof. The opposite UE (the second terminal) may be informed of the terminal type of the UE based on the physical layer parameter used by the UE.

At block 702, the method may include the first terminal receiving the first message through the sidelink.

At block 703, the method may include the first terminal acquiring a physical layer parameter corresponding to the first message, and recognizing the terminal type of the second terminal based on the physical layer parameter corresponding to the first message.

In an embodiment, the terminal type is configured to indicate at least one information of the terminal transmitting the first message being the RedCap terminal or the non-RedCap terminal; the RedCap-terminal sub type of the terminal transmitting the first message, in response to the terminal transmitting the first message being the RedCap terminal; the RedCap-terminal sub type includes at least one of the high-level RedCap terminal, the low-level RedCap terminal, the RedCap terminal of the FR1 frequency band, and the RedCap terminal of the FR2 frequency band; the high-level RedCap terminal and the low-level RedCap terminal are RedCap terminals which are divided based on specified capability information, and the specified capability information includes at least one of the transmission rate, the number of the Rx antennas, the number of the Tx antennas, and the maximum supported bandwidth; the application scenario of the terminal transmitting the first message in response to the terminal transmitting the first message being the RedCap terminal; the number of the Rx antennas of the terminal transmitting the first message in response to the terminal transmitting the first message being the RedCap terminal; the number of the Tx antennas of the terminal transmitting the first message in response to the terminal transmitting the first message being the RedCap terminal; and the maximum bandwidth supported by the terminal transmitting the first message in response to the terminal transmitting the first message being the RedCap terminal.

At block 704, the method may include the first terminal communicating with the second terminal based on the terminal type of the second terminal.

In summary, according to the scheme shown in the embodiment of the present disclosure, in the sidewalk link communication, before the terminal capability information is transmitted between the first terminal and the second terminal, the second terminal may implicitly indicate whether it is the RedCap terminal through the physical layer parameter of the first message, such that the first terminal may subsequently communicate with the second terminal based on the information of whether the second terminal is the RedCap terminal. In this way, the success rate of the sidelink communication of the RedCap terminal may be improved, and the communication efficiency of the sidelink may be improved.

The solution shown in FIGS. 4 to 7, before the terminal capability information exchange process is performed, a recognition for the terminal type related to the RedCap terminal may be completed between the terminals supported the sidelink through the type indication information, the resource pool to which the message belongs, the layer-2 ID of the message or the physical layer parameter of the message, respectively, which are directly carried in the message. In this way, a possibility of a subsequent communication failure may be reduced accordingly. The solution shown in FIG. 4-FIG. 7 described above may be used independently to perform a recognition of the terminal type, alternatively, the solution shown in FIG. 4-FIG. 7 described above may be used in combination to perform the recognition of the terminal type, which is not limited in the embodiment of the present disclosure.

The following are apparatus embodiments of the present disclosure, which may be configured to perform the method embodiments of the present disclosure. Undisclosed details in the apparatus embodiments of the present disclosure may refer to the method embodiments of the present disclosure.

Figure 8:
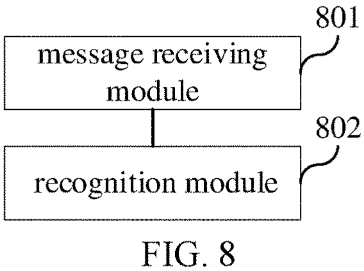
FIG. 8 is a block view of a terminal recognition apparatus illustrated according to an example embodiment of the present disclosure.

FIG. 8 is a block view of a terminal recognition apparatus illustrated according to an example embodiment of the present disclosure. As shown in FIG. 8, the terminal recognition apparatus may be implemented as a whole or a part of the UE 110 in the implementation environment illustrated in FIG. 1 in a manner of a hardware or a combination of the hardware and a software, to perform operations performed by the first terminal in any of embodiments of FIGS. 2 to 7. The terminal recognition device may include a message receiving module 801 and a recognition module 802.

The message receiving module 801 is configured to receive a first message through a sidelink. The first message is a message transmitted by a second terminal before the second terminal performs a capability information exchange process with the first terminal through the sidelink.

The recognition module 802 is configured to recognize a terminal type of the second terminal based on the first message. The terminal type includes a RedCap terminal.

In an embodiment, the recognition module 802 is configured to acquire a type indication information from the first message. The type indication information is configured to indicate the terminal type of the second terminal; and recognize the terminal type of the second terminal based on the type indication information.

In an embodiment, the first message includes at least one of a PC5-S message, a PC5-RRC message, a MAC CE, and a PSCCH message.

In an embodiment, the PC5-S message includes at least one message of a message of Discovery announce on PC5, a message of announce a ProSe Query Code on PC5, a message of a ProSe Response Code on PC5, a Direct Communication Request message, and a Direct Communication Accept message.

In an embodiment, the recognition module 802 is configured to recognize the terminal type of the second terminal based on a resource pool to which a resource corresponding to the first message belongs.

In an embodiment, resource pools of different terminal types satisfy at least one condition of resources in the resource pools of the different terminal types having no overlap in a time domain; the resources in the resource pools of the different terminal types having no overlap in a frequency domain; the resource pools of the different terminal types corresponding to different DMRS scrambling code IDs; and the resource pools of the different terminal types corresponding to different PSFCH cyclic displacements.

In an embodiment, the recognition module 802 is configured to acquire a layer-2 ID of the first message; and recognize the terminal type of the second terminal based on the layer-2 ID of the first message.

In an embodiment, the recognition module 802 is configured to acquire a physical layer parameter corresponding to the first message; and recognize the terminal type of the second terminal based on the physical layer parameter corresponding to the first message.

In an embodiment, the physical layer parameter includes at least one of a reference signal sequence and a reference signal cyclic shift.

In an embodiment, the terminal type is configured to indicate at least one information of a terminal transmitting the first message being the RedCap terminal or a non-RedCap terminal; a RedCap-terminal sub type of the terminal transmitting the first message, in response to the terminal transmitting the first message being the RedCap terminal; wherein the RedCap-terminal sub type includes at least one of a high-level RedCap terminal, a low-level RedCap terminal, a RedCap terminal of a (Frequency Range) FR1 frequency band, and a RedCap terminal of a FR2 frequency band; the high-level RedCap terminal and the low-level RedCap terminal are RedCap terminals which are divided based on specified capability information, and the specified capability information includes at least one of a transmission rate, the number of Receive (Rx) antennas, the number of Transport (Tx) antennas, and a maximum supported bandwidth; an application scenario of the terminal transmitting the first message in response to the terminal transmitting the first message being the RedCap terminal; the number of the Rx antennas of the terminal transmitting the first message in response to the terminal transmitting the first message being the RedCap terminal; the number of the Tx antennas of the terminal transmitting the first message in response to the terminal transmitting the first message being the RedCap terminal; and a maximum bandwidth supported by the terminal transmitting the first message in response to the terminal transmitting the first message being the RedCap terminal.

In summary, according to the solution in the embodiment of the present disclosure, in the sidewalk link communication, before the terminal capability information is transmitted between the first terminal and the second terminal, the second terminal may indicate whether it is the RedCap terminal through the first message, such that the first terminal may subsequently communicate with the second terminal based on information of whether the second terminal is the RedCap terminal. In this way, the success rate of the sidelink communication of the RedCap terminal may be improved, and the communication efficiency of the sidelink may be improved.

Figure 9:
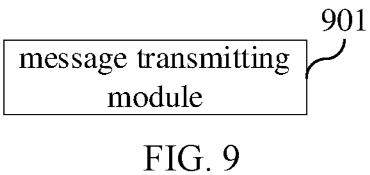
FIG. 9 is a block view of a terminal recognition apparatus illustrated according to an example embodiment of the present disclosure.

FIG. 9 is a block view of a terminal recognition apparatus illustrated according to an example embodiment of the present disclosure. As shown in FIG. 9, the terminal recognition apparatus may be implemented as the whole or the part of the UE 110 in the implementation environment illustrated in FIG. 1 in the manner of the hardware or the combination of the hardware and the software, to perform the operations performed by the second terminal in any of embodiments of FIGS. 2 to 7. The terminal recognition device may include a message transmitting module 901.

The message transmitting module 901 is configured to transmit a first message through a sidelink before performing a capability information exchange process with a first terminal through the sidelink. The first message is configured to indicate the first terminal to recognize a terminal type of the second terminal, and the terminal type includes a RedCap terminal.

In an embodiment, the message transmitting module 901 is configured to transmit the first message including type indication information through the sidelink. The type indication information is configured to indicate the terminal type of the second terminal.

In an embodiment, the first message includes at least one of a PC5-S message, a PC5-RRC message, a MAC CE, and a PSCCH message.

In an embodiment, the PC5-S message includes at least one message of a message of Discovery announce on PC5, a message of announce a ProSe Query Code on PC5, a message of a ProSe Response Code on PC5, a Direct Communication Request message, and a Direct Communication Accept message.

In an embodiment, the message transmitting module 901 is configured to transmit the first message through the sidelink on a resource in a resource pool of the terminal type of the second terminal.

In an embodiment, resource pools of different terminal types satisfy at least one condition of resources in the resource pools of the different terminal types having no overlap in a time domain; the resources in the resource pools of the different terminal types having no overlap in a frequency domain; the resource pools of the different terminal types corresponding to different DMRS scrambling code IDs; and the resource pools of the different terminal types corresponding to different PSFCH cyclic displacements.

In an embodiment, the apparatus further includes an ID setting module. The ID setting module is configured to set a layer-2 ID in the first message to be a layer-2 ID corresponding to the terminal type of the second terminal.

In an embodiment, the message transmitting module 901 is configured to transmit the first message through the sidelink based on a physical layer parameter corresponding to the terminal type of the second terminal.

In an embodiment, the physical layer parameter includes at least one of a reference signal sequence and a reference signal cyclic shift.

In an embodiment, the terminal type is configured to indicate at least one information of a terminal transmitting the first message being the RedCap terminal or a non-RedCap terminal; a RedCap-terminal sub type of the terminal transmitting the first message, in response to the terminal transmitting the first message being the RedCap terminal; wherein the RedCap-terminal sub type includes at least one of a high-level RedCap terminal, a low-level RedCap terminal, a RedCap terminal of a (Frequency Range) FR1 frequency band, and a RedCap terminal of a FR2 frequency band; the high-level RedCap terminal and the low-level RedCap terminal are RedCap terminals which are divided based on specified capability information, and the specified capability information includes at least one of a transmission rate, the number of Receive (Rx) antennas, the number of Transport (Tx) antennas, and a maximum supported bandwidth; an application scenario of the terminal transmitting the first message in response to the terminal transmitting the first message being the RedCap terminal; the number of the Rx antennas of the terminal transmitting the first message in response to the terminal transmitting the first message being the RedCap terminal; the number of the Tx antennas of the terminal transmitting the first message in response to the terminal transmitting the first message being the RedCap terminal; and a maximum bandwidth supported by the terminal transmitting the first message in response to the terminal transmitting the first message being the RedCap terminal.

In summary, according to the solution in the embodiment of the present disclosure, in the sidewalk link communication, before the terminal capability information is transmitted between the first terminal and the second terminal, the second terminal may indicate whether it is the RedCap terminal through the first message, such that the first terminal may subsequently communicate with the second terminal based on information of whether the second terminal is the RedCap terminal. In this way, the success rate of the sidelink communication of the RedCap terminal may be improved, and the communication efficiency of the sidelink may be improved.

It is to be noted that, when the apparatus provided in the embodiments described above implements the function thereof, a division for each function module is merely taken as an example for description. In the actual application, the function described above may be divided to different functional modules for implementation based on actual needs. That is, a content structure of a device is divided into the different functional modules to complete the above-described function in whole or in part.

Regarding the apparatus in the above embodiments, a specific manner of each module performing an operation has been described in detail in the embodiments related to the method, which is not described in detail herein.

Figure 10:
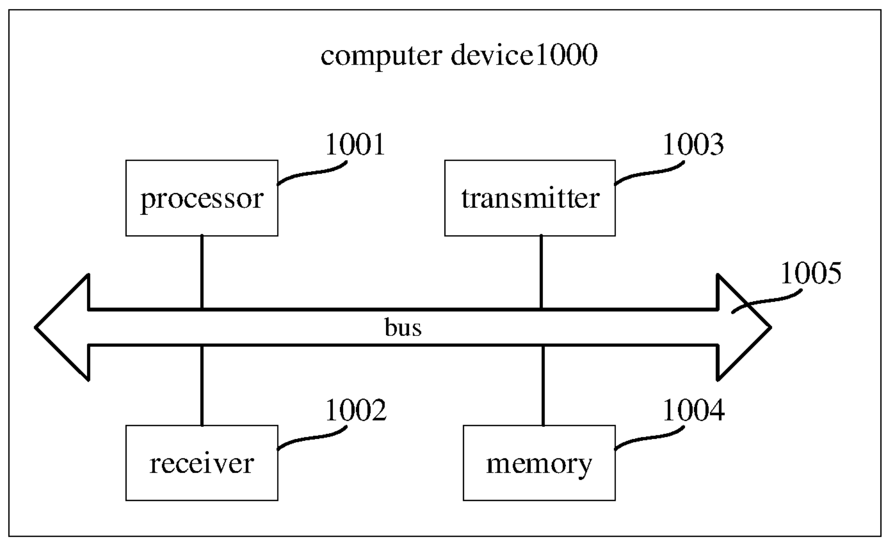
FIG. 10 is a structural schematic view of a computer device according to an embodiment of the present disclosure.

As shown in FIG. 10, FIG. 10 is a structural schematic view of a computer device 1000 according to an embodiment of the present disclosure. The computer device 1000 may include a processor 1001, a receiver 1002, a transmitter 103, a memory 1004, and a bus 1005.

The processor 1001 includes one or more processing cores and executes various functional applications and information processing through running software programs and modules.

The receiver 1002 and the transmitter 1003 may be implemented as a communication component. The communication component may be a communication chip. The communication chip may also be referred to as a transceiver.

The memory 1004 is connected to the processor 1001 via the bus 1005.

The memory 1004 is configured to store a computer program. The processor 1001 is configured to execute the computer program to implement each operation performed by the network side device or the terminal in the wireless communication system in the above method embodiments.

In addition, the memory 1004 may be implemented by any type of a volatile or non-volatile storage device or a combination thereof. The volatile or non-volatile storage device includes, but not limited to a disk or an optical disc, an electrically erasable programmable read-only memory, an erasable programmable read-only memory, a static ready-to-access memory, a read-only memory, a magnetic memory, a flash memory, and a programmable read-only memory.

In exemplary embodiments, the computer device includes the processor, the memory, and the transceiver (which may include the receiver and the transmitter, the receiver being configured to receive information and the transmitter being configured to transmit the information).

In an embodiment, when the computer device is implemented as the UE in the system shown in FIG. 1, the transceiver is configured to receive a first message through a sidelink. The first message is a message transmitted by a second terminal before the second terminal performs a capability information exchange process with the first terminal through the sidelink.

The processor is configured to recognize a terminal type of the second terminal based on the first message. The terminal type includes a RedCap terminal.

In this case, the computer device may be configured to implement operations performed by the first terminal in the solution shown in the FIGS. 2 to 7 in whole or in part.

In an embodiment, when the computer device is implemented as the UE in the system shown in FIG. 1, the transceiver is configured to transmit a first message through a sidelink before performing a capability information exchange process with a first terminal through the sidelink. The first message is configured to indicate the first terminal to recognize a terminal type of the second terminal, and the terminal type includes a RedCap terminal.

In this case, the computer device may be configured to implement operations performed by the second terminal in the solution shown in the FIGS. 2 to 7 in whole or in part.

Embodiments of the present disclosure also provide a computer-readable storage medium. The storage medium stores a computer program. The computer program is loaded and executed by a processor to implement each operation performed by the terminal in the method shown in FIG. 2 or FIG. 3.

The present disclosure also provides a computer program product. The computer program product includes computer instructions. The computer instructions are stored in a computer-readable storage medium. A processor of a computer device is configured to read the computer instructions from the computer-readable storage medium and execute the computer instructions to cause the computer device to implement each operation performed by the first terminal or the second terminal in the above method shown in FIGS. 2 to 7.

The present disclosure also provides a chip. The chip is configured to run in a computer device to cause the computer device to implement each operation performed by the first terminal or the second terminal in the above method shown in FIGS. 2 to 7.

The present disclosure also provides a computer program. The computer program is executed by a processor of a computer device to cause the computer device to implement each operation performed by the first terminal or the second terminal in the above method shown in FIGS. 2 to 7.

It should be appreciated by those skilled in the art that, in one or more examples described above, the function described in the embodiments of the present disclosure may be implemented as the hardware, the software, a firmware, or any combination thereof. When implemented as the software, the functions may be stored in the computer-readable medium or transmitted as one or more instructions or codes on the computer-readable medium. The computer-readable medium includes a computer storage medium and a communication medium. The communication medium includes any medium which facilitates a transmission of the computer program from one location to another location. The storage medium may be any available medium which allows a general-purpose computer or a special-purpose computer to access.

The above description is only exemplary embodiments of the present disclosure and is not intended to limit the present disclosure. Any modification, equivalent substitution, improvement, etc., made within a spirit and a principle of the present disclosure shall fall into the scope of the present disclosure.

What is claimed is:

1. A terminal recognition method, wherein the method is performed by a first terminal and comprises:

receiving a first message through a sidelink, wherein the first message is a message transmitted by a second terminal before the second terminal performs a capability information exchange process with the first terminal through the sidelink; and recognizing a terminal type of the second terminal based on the first message, wherein the terminal type comprises a Reduced Capability (RedCap) terminal, wherein the recognizing a terminal type of the second terminal based on the first message, comprises:

recognizing the terminal type of the second terminal based on a resource pool to which a resource corresponding to the first message belongs.

2. The method according to claim 1, wherein the recognizing a terminal type of the second terminal based on the first message, comprises:

acquiring a type indication information from the first message, wherein the type indication information is configured to indicate the terminal type of the second terminal; and recognizing the terminal type of the second terminal based on the type indication information.

3. The method according to claim 2, wherein the first message comprises at least one of a PC5 interface (PC5) based Security (PC5-S) message, a PCS based Radio Resource Control (PC5-RRC) message, a Media Access Control layer Control Element (MAC CE), or a Physical Sidelink Control Channel (PSCCH) message.

4. The method according to claim 3, wherein the PC5-S message comprises at least one of a message of Discovery announce on PC5, a message of announce a Proximity Service (ProSe) Query Code on PC5, a message of a ProSe Response Code on PC5, a Direct Communication Request message, or a Direct Communication Accept message.

5. The method according to claim 1, wherein resource pools of different terminal types satisfy at least one condition of:

resources in the resource pools of the different terminal types having no overlap in a time domain;

the resources in the resource pools of the different terminal types having no overlap in a frequency domain;

the resource pools of the different terminal types corresponding to different Demodulation Reference Signal (DMRS) scrambling code Identities (IDs); or the resource pools of the different terminal types corresponding to different Physical Sidelink Feedback Channel (PSFCH) cyclic displacements.

6. The method according to claim 1, wherein the recognizing a terminal type of the second terminal based on the first message, comprises:

acquiring a layer-2 ID of the first message; and recognizing the terminal type of the second terminal based on the layer-2 ID of the first message.

7. The method according to claim 1, wherein the recognizing a terminal type of the second terminal based on the first message, comprises:

acquiring a physical layer parameter corresponding to the first message; and recognizing the terminal type of the second terminal based on the physical layer parameter corresponding to the first message.

8. The method according to claim 7, wherein the physical layer parameter comprises at least one of a reference signal sequence or a reference signal cyclic shift.

9. The method according to claim 1, wherein the terminal type is configured to indicate at least one information of:

a terminal transmitting the first message being the RedCap terminal or a non-RedCap terminal;

a RedCap-terminal sub type of the terminal transmitting the first message, in response to the terminal transmitting the first message being the RedCap terminal; wherein the RedCap-terminal sub type comprises at least one of a high-level RedCap terminal, a low-level RedCap terminal, a RedCap terminal of a (Frequency Range) FR1 frequency band, or a RedCap terminal of a FR2 frequency band; the high-level RedCap terminal and the low-level RedCap terminal are RedCap terminals which are divided based on specified capability information, and the specified capability information comprises at least one of a transmission rate, the number of Receive (Rx) antennas, the number of Transport (Tx) antennas, or a maximum supported bandwidth;

an application scenario of the terminal transmitting the first message in response to the terminal transmitting the first message being the RedCap terminal;

the number of the Rx antennas of the terminal transmitting the first message in response to the terminal transmitting the first message being the RedCap terminal;

the number of the Tx antennas of the terminal transmitting the first message in response to the terminal transmitting the first message being the RedCap terminal; or a maximum bandwidth supported by the terminal transmitting the first message in response to the terminal transmitting the first message being the RedCap terminal.

10. A terminal recognition method, wherein the method is performed by a second terminal and comprises:

transmitting a first message through a sidelink before performing a capability information exchange process with a first terminal through the sidelink, wherein the first message is configured to indicate the first terminal to recognize a terminal type of the second terminal, and the terminal type comprises a Reduced Capability (RedCap) terminal, wherein the transmitting a first message through a sidelink, comprises:

transmitting the first message through the sidelink on a resource in a resource pool of the terminal type of the second terminal.

11. The method according to claim 10, wherein the transmitting a first message through a sidelink, comprises:

transmitting the first message comprising type indication information through the sidelink, wherein the type indication information is configured to indicate the terminal type of the second terminal.

12. The method according to claim 11, wherein the first message comprises at least one of a PC5-S message, a PC5-RRC message, a MAC CE, or a PSCCH message.

13. The method according to claim 12, wherein the PC5-S message comprises at least one of a message of discovery announce on PC5, a message of announce a Proximity Service (ProSe) Query Code on PC5, a message of a ProSe Response Code on PC5, a Direct Communication Request message, or a Direct Communication Accept message.

14. The method according to claim 10, wherein resource pools of different terminal types satisfy at least one condition of:

resources in the resource pools of the different terminal types having no overlap in a time domain;

the resources in the resource pools of the different terminal types having no overlap in a frequency domain;

the resource pools of the different terminal types corresponding to different DMRS scrambling code IDs; or the resource pools of the different terminal types corresponding to different PPSFCH cyclic displacements.

15. The method according to claim 10, wherein before the transmitting a first message through a sidelink, the method further comprises:

setting a layer-2 ID in the first message to be a layer-2 ID corresponding to the terminal type of the second terminal.

16. The method according to claim 10, wherein the transmitting a first message through a sidelink, comprises:

transmitting the first message through the sidelink based on a physical layer parameter corresponding to the terminal type of the second terminal;

wherein the physical layer parameter comprises at least one of a reference signal sequence or a reference signal cyclic shift.

17. The method according to claim 10, wherein the terminal type is configured to indicate at least one information of:

a terminal transmitting the first message being the RedCap terminal or a non-low capability terminal;

a RedCap-terminal sub type of the terminal transmitting the first message, in response to the terminal transmitting the first message being the RedCap terminal; wherein the RedCap-terminal sub type comprises at least one of a high-level RedCap terminal, a low-level RedCap terminal, a RedCap terminal of a FR1 frequency band, or a RedCap terminal of a FR2 frequency band; the high-level RedCap terminal and the low-level RedCap terminal are RedCap terminals which are divided based on specified capability information, and the specified capability information comprises at least one of a transmission rate, the number of Rx antennas, the number of Tx antennas, or a maximum supported bandwidth;

an application scenario of the terminal transmitting the first message in response to the terminal transmitting the first message being the RedCap terminal;

the number of the Rx antennas of the terminal transmitting the first message in response to the terminal transmitting the first message being the RedCap terminal;

the number of the Tx antennas of the terminal transmitting the first message in response to the terminal transmitting the first message being the RedCap terminal; or a maximum bandwidth supported by the terminal transmitting the first message in response to the terminal transmitting the first message being the RedCap terminal.

18. A computer device, wherein the computer device is implemented as a first terminal and comprises:

a memory;

a transceiver, configured to receive a first message through a sidelink, wherein the first message is a message transmitted by a second terminal before the second terminal performs a capability information exchange process with the first terminal through the sidelink; and a processor, configured to recognize a terminal type of the second terminal based on the first message, wherein the terminal type comprises a Reduced Capability (RedCap) terminal; or wherein the computer device is implemented as a first terminal and comprises:

a processor;

a memory;

a transceiver, configured to transmit a first message through a sidelink before performing a capability information exchange process with a first terminal through the sidelink, wherein the first message is configured to indicate the first terminal to recognize a terminal type of the second terminal, and the terminal type comprises a Reduced Capability (RedCap) terminal, wherein transceiver is further configured to:

transmit the first message through the sidelink on a resource in a resource pool of the terminal type of the second terminal.

* * * * *